US011928841B2

United States Patent
Vianello et al.

(10) Patent No.: US 11,928,841 B2
(45) Date of Patent: Mar. 12, 2024

(54) SYSTEM AND METHOD OF OPTICAL SCANNING OF A VEHICLE FOR MEASURING AND/OR CONTROLLING THE VEHICLE AND/OR PARTS THEREOF

(71) Applicants: TEXA S.P.A., Monastier di Treviso (IT); RAVAGLIOLI S.P.A., Sasso Marconi (IT)

(72) Inventors: Bruno Vianello, Monastier di Treviso (IT); Massimo Mambrilla, Scalenghe (IT)

(73) Assignees: TEXA S.P.A., Monastier di Treviso (IT); Ravaglioli S.P.A., Sasso Marconi (IT)

( * ) Notice: Subject to any disclaimer, the term of this patent is extended or adjusted under 35 U.S.C. 154(b) by 0 days.

(21) Appl. No.: 17/547,441

(22) Filed: Dec. 10, 2021

(65) Prior Publication Data

US 2022/0189067 A1 Jun. 16, 2022

(30) Foreign Application Priority Data

Dec. 11, 2020 (IT) .................. 102020000030578

(51) Int. Cl.
| | | |
|---|---|---|
| *G06T 7/80* | (2017.01) | |
| *G01S 7/497* | (2006.01) | |
| *G01S 17/894* | (2020.01) | |
| *G06T 7/60* | (2017.01) | |

(Continued)

(52) U.S. Cl.
CPC .............. *G06T 7/85* (2017.01); *G01S 7/497* (2013.01); *G01S 17/894* (2020.01); *G06T 7/60* (2013.01);
(Continued)

(58) Field of Classification Search
CPC ..... G06T 7/85; G06T 7/60; G06T 7/70; G01S 7/497; G01S 17/894; H04N 13/239;
(Continued)

(56) References Cited

U.S. PATENT DOCUMENTS

| | | | |
|---|---|---|---|
| 6,498,959 B1 * | 12/2002 | January ................ | G01B 11/275 356/138 |
| 10,240,916 B1 * | 3/2019 | Golab .................. | G01B 11/275 |

(Continued)

FOREIGN PATENT DOCUMENTS

| | | |
|---|---|---|
| DE | 102017203426 A1 | 9/2018 |
| EP | 3002551 A1 | 4/2016 |
| EP | 2769177 B1 | 2/2020 |

OTHER PUBLICATIONS

Search Report in corresponding Italian Patent Application No. 102020000030578, dated Jul. 20, 2021, 7 pages.

*Primary Examiner* — Susan E. Torgerson
(74) *Attorney, Agent, or Firm* — Leason Ellis LLP (57) ABSTRACT

An optical scanning system for measuring and/or controlling a vehicle and/or parts of a vehicle, wherein the vehicle is arranged on a support surface. The optical scanning system comprises two optical reader apparatuses, which are arranged on said support surface, on opposite sides of the vehicle, and are provided with respective optical image capturing devices configured to provide respective data/signals encoding one or more images of the vehicle, an electronic system, which is designed to process the data/signals in order to construct one or more three-dimensional images of the vehicle. The optical image reader apparatuses each comprise a calibration target, which lies on an approximately horizontal support surface and is arranged immediately adjacent to the optical image capturing device of the relative optical image reader apparatus at a predetermined distance from it.

20 Claims, 6 Drawing Sheets

(51) Int. Cl.
*G06T 7/70* (2017.01)
*H04N 13/239* (2018.01)
*H04N 13/254* (2018.01)
*H04N 13/296* (2018.01)

(52) U.S. Cl.
CPC ............. *G06T 7/70* (2017.01); *H04N 13/239* (2018.05); *H04N 13/254* (2018.05); *H04N 13/296* (2018.05); *H04N 2213/001* (2013.01)

(58) Field of Classification Search
CPC ............... H04N 13/254; H04N 13/296; H04N 2213/001; G01B 2210/12; G01B 2210/143; G01B 2210/146; G01B 11/275; G01B 11/24; G01B 11/26; G01B 11/2755; G01B 2210/303; G01M 17/007; G01M 17/00
USPC .......................................................... 348/47
See application file for complete search history.

(56) References Cited

U.S. PATENT DOCUMENTS

| | | | |
|---|---|---|---|
| 2008/0148581 A1* | 6/2008 | Boni .................. | G01B 11/2755 33/288 |
| 2010/0026712 A1* | 2/2010 | Aliprandi ................ | G06T 15/20 345/629 |
| 2010/0318307 A1* | 12/2010 | Schommer ............. | G01B 11/27 73/1.79 |
| 2018/0075675 A1* | 3/2018 | Kim ........................ | G01S 7/40 |
| 2019/0249985 A1* | 8/2019 | Stieff .................... | G01S 7/4972 |
| 2021/0278203 A1* | 9/2021 | Corghi ............... | G01B 11/2755 |

\* cited by examiner

SYSTEM AND METHOD OF OPTICAL SCANNING OF A VEHICLE FOR MEASURING AND/OR CONTROLLING THE VEHICLE AND/OR PARTS THEREOF

CROSS-REFERENCE TO RELATED APPLICATIONS

This patent application claims priority from Italian patent application no. 102020000030578 filed on Dec. 11, 2020, the entire disclosure of which is incorporated herein by reference.

TECHNICAL FIELD

The invention relates to a vehicle optical scanning system and method for measuring/controlling the vehicle and/or parts of the vehicle. In particular, the invention deals with the calibration of an optical scanning system for measuring and/or controlling a vehicle and/or parts thereof.

BACKGROUND ART

Systems are known, which are designed to carry out an optical scanning of a vehicle so as to obtain three-dimensional images of the vehicle and/or of parts thereof.

Some known types of optical scanning systems are used to capture three-dimensional images of the lateral sides of the vehicle in order to determine, based on the captured images, geometric parameters concerning the parts making up the vehicle corresponding, for example, to the wheels and/or the steering and/or the axles of the vehicle.

In some optical scanning systems used to determine the attitude of the wheels of the vehicle, geometric parameters are generally determined, which comprise the angles of the wheels and/or of the steering and/or of the axles, which characterise the so-called "attitude" of the vehicle. More in detail, in optical scanning systems used to determine the attitude of the wheels of the vehicle, the angle of attack, the camber angle and the toe-in angle of the wheels are determined and said measured angles are compared with corresponding reference angles associated with a correct attitude condition. Based on the outcome of the comparison, it is determined whether it is necessary or unnecessary to mechanically intervene in order to adjust the angular position of the wheels so as to comply with a correct attitude condition.

Some optical scanning systems used to determine the attitude of the wheels commonly comprise three-dimensional optical image readers, which are arranged so as to face the two lateral opposite sides of the vehicle and are configured to carry out an optical scanning of the lateral sides of the vehicle in order to obtain a tree-dimensional digital representation thereof, from which to obtain a digital image representation and/or a geometric representation of the wheels of the vehicle.

Based on this representation, the system is able to determine the correctness of the vehicle attitude or the lack thereof.

In order to be able to carry out a correct three-dimensional digital reconstruction of the vehicle and/or of parts thereof, the systems described above have to geometrically characterise the mutual positioning and the visual field of three-dimensional optical readers relative to a common reference system.

To this aim, a great precision is required, which lies in the order of hundredths of degree for the angle of orientation of the three-dimensional optical readers and in the order of tenths of millimetres for the distances between them.

Hence, in order to be able to correctly operate, the optical scanning systems described above require an initial calibration, during which the aforesaid geometrical parameters of the three-dimensional optical readers are determined with precision.

It often happens that, following this calibration, the three-dimensional optical readers are subjected to movements caused by accidental hits, thermal expansions, etc. These movements, even though very small, change the geometric characterisation of the three-dimensional optical readers established during the calibration phase and significantly affect the accuracy of the reconstruction of the three-dimensional image of the vehicle or of parts thereof.

For example, in case of optical scanning systems used to determine the attitude of the wheels, the accidental movements of the three-dimensional optical readers cause the introduction of significant errors in the control of the attitude of the vehicle.

In order to overcome this technical problem, some optical scanning systems are provided with calibration systems, which detect the movements of the three-dimensional optical readers relative to the data detected during the calibration phase and recalibrate them based on the detected movements.

Some calibration system, such as the one described in EP 2 769 177 B1, involve the use of reference targets, which are vertically fixed on the three-dimensional optical reader. In use, a first optical reader is placed in the control station next to the vehicle so as to frame the target fixed on an opposite second optical reader and the calibration of the first optical reader is carried out based on the image of the fixed target present on the second optical reader.

A technical problem affecting calibration systems of the type described above lies in the fact that these systems are not suitable for calibrating an optical reader when the vehicle is standing in the control station between the optical readers. In this condition, the vehicle is interposed between the optical reader and the reference target fixed on the other optical reader. Therefore, the control station has to be free from vehicles, a condition that is not always appreciated by mechanical operators taking care of the control of the vehicle.

Furthermore, mechanical operators, on the one hand, need to have three-dimensional optical readers that are easily removable so that they can clear the space inside the service department in order to make room for other activities to be performed on the vehicles and, on the other hand, need to not have to make adjustments of the system every time the three-dimensional optical readers are re-positioned in the control station.

Another type of system is further described in DE 10 2017 203426 A.

DESCRIPTION OF THE INVENTION

Therefore, the object of the invention is to provide an optical scanning method and system for measuring and/or controlling the vehicle and/or parts of the vehicle, which overcome the technical problem described above and fulfil the needs discussed above.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

With reference to FIGS. 1 to 7, number 1 indicates, as a whole, an optical scanning system for a vehicle 2 for measuring and/or controlling the vehicle 2 and/or parts/components of the vehicle 2.

Figure 1:
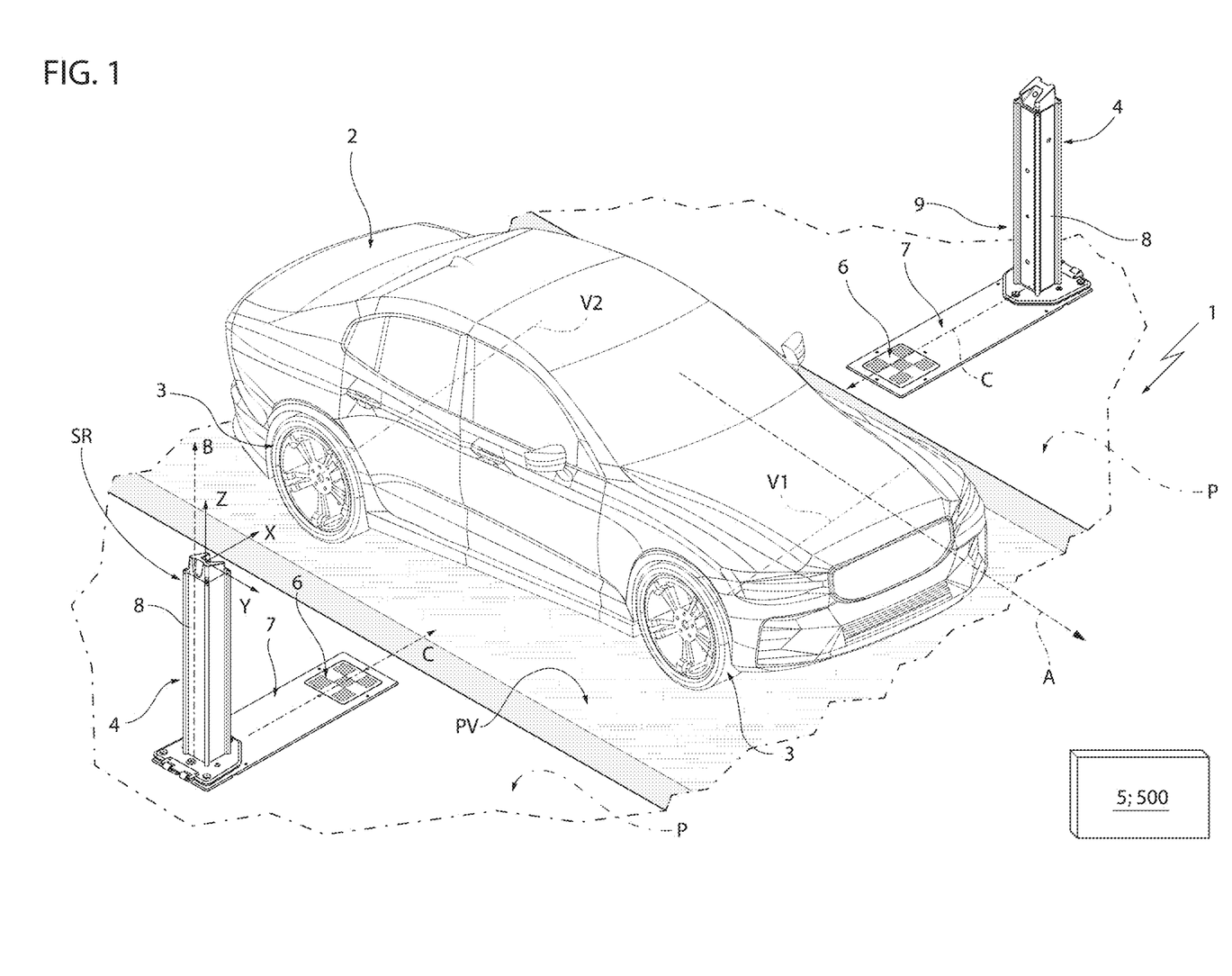
FIG. 1 is a perspective view of a vehicle optical scanning system according to the invention.
Figure 7:
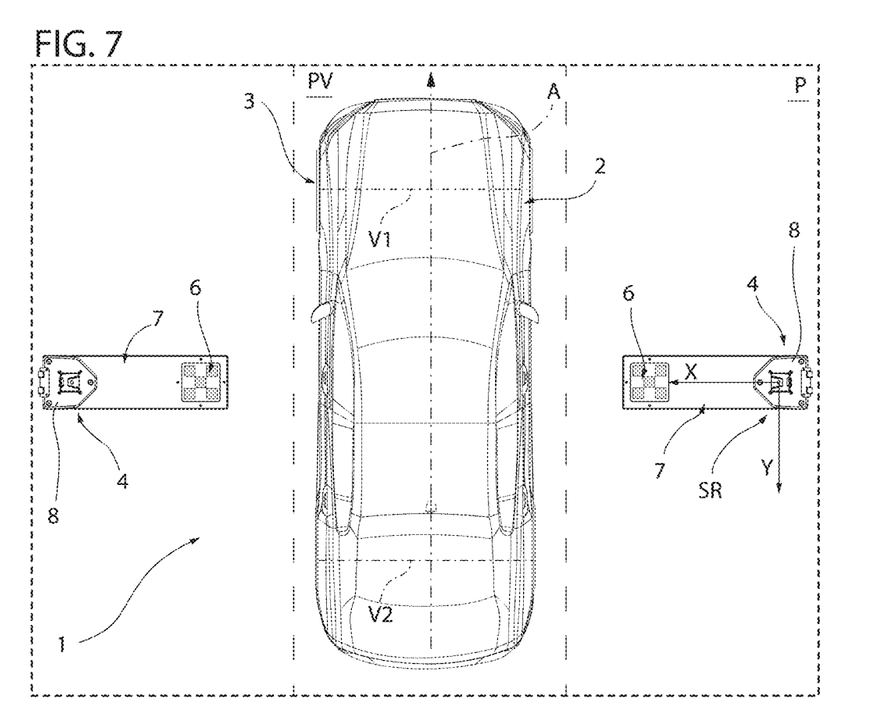
FIG. 7 is a view from the top of the vehicle optical scanning system shown in FIG. 1.

In the example shown in FIGS. 1 and 7, the vehicle 2 is arranged in a control station, which comprises a plane, on which, in use, the wheels 3 of the vehicle 2 rest. The plane can correspond, for example, to the support surface, for instance a horizontal one. The support surface can correspond to a floor/ground present in the vehicle control station, for example inside a vehicle service department (which is not shown herein). Obviously, the plane can comprise any plane on which the wheels 3 of the vehicle 2 rest.

Figure 6:
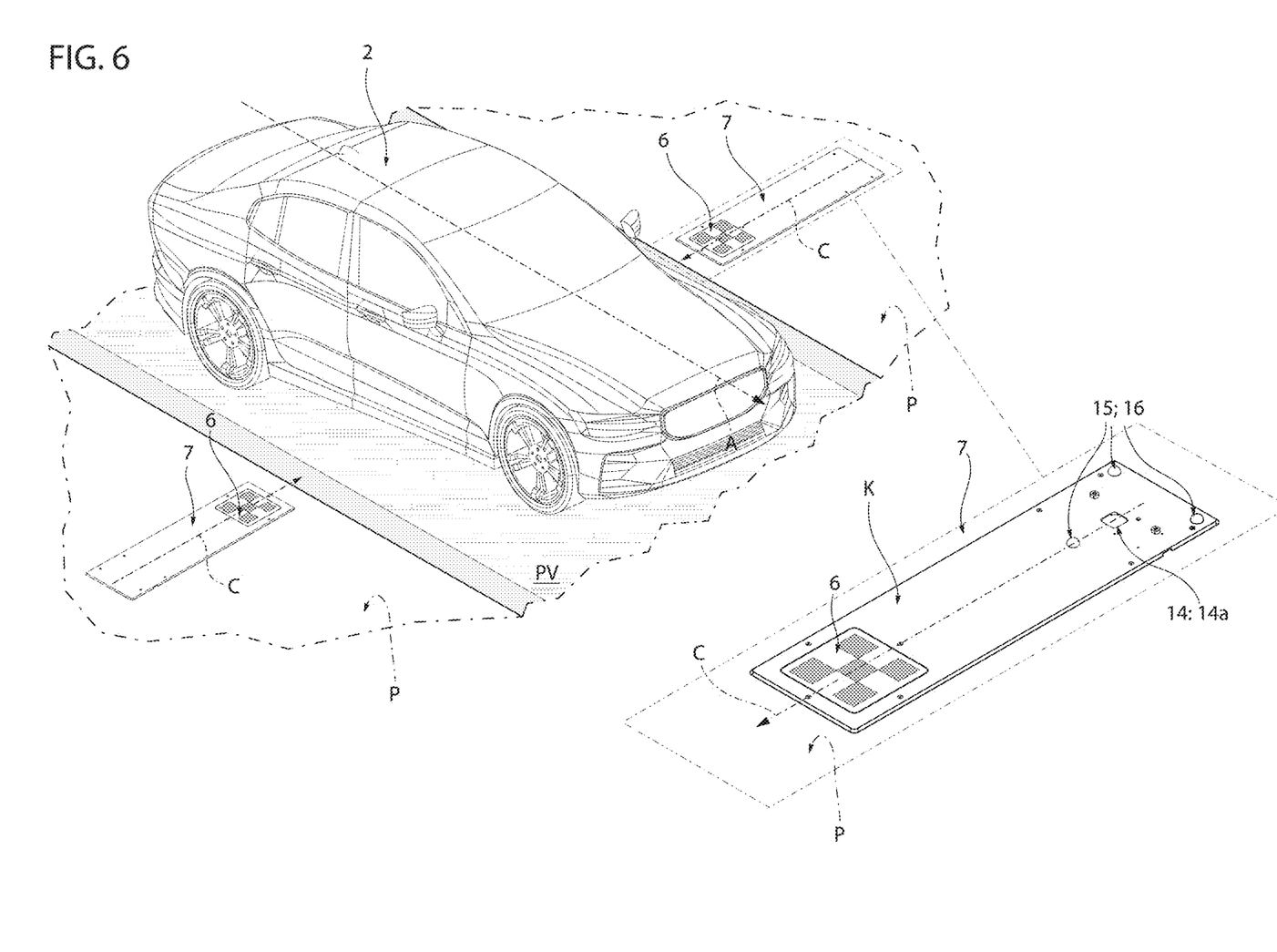
FIG. 6 shows the plate-shaped elements, on a larger scale, of the vehicle optical scanning system shown in FIG. 1.

The vehicle 2 can be a motor vehicle with an engine, in particular a car, and, in the example shown in FIGS. 1, 6 and 7, it centrally has a longitudinal reference axis A and is provided with four wheels 3 coupled, in pairs, to two corresponding axles, namely a front axle V1 and a rear axle V2, of the vehicle 2, which are transverse to the axis A (namely, orthogonal thereto in the accompanying Figures) and are at a given axle base distance from one another (measured along the axis A).

It is understood that in the description below, the term wheel 3 indicates a common wheel of a car comprising at least a rim and a tyre. Furthermore it is understood that the invention is not limited to a car, but can be applied to any type of motor vehicle provided with any number of wheels and axles Vi (wherein i is variable=>2), for example a truck or a lorry or a bus, having two or more axles and four or more wheels 3.

The optical scanning system 1 is designed to determine a series of geometric parameters characterising the vehicle 2 and/or parts/components thereof.

According to a preferred embodiment of the invention, the geometric parameters of the parts/components of the vehicle can, for example, relate to: the wheels 3 and/or the axles V1, V2 and/or the steering (which is not shown herein). The geometric parameters of the wheels 3 can comprise, for example: the angle or plane of attack of the wheel, the camber angle of the wheel, the toe angle or plane of the wheel. The angles or planes can preferably be determined relative to at least one predetermined three-dimensional reference system SR. The geometric parameters characterising the wheels 3 used in the optical scanning system 1 for the control, for example, of the wheel attitude of the vehicle 2 are known and, therefore, will not be discussed any further.

It is understood that the optical scanning system 1 is not limited to the determination of the above-mentioned geometric parameters for the control of the wheel attitude of the vehicle 2, but, in addition and/or alternatively, it can involve the determination of other pieces of information concerning the vehicle 2. These pieces of information can comprise, for instance, the position of the vehicle 2 within the vehicle control station P relative to the predetermined three-dimensional reference system SR.

According to this embodiment, the optical scanning system 1 can be designed to determine the position of the vehicle 2 relative to the predetermined reference system SR based on the images of the axles V1 and/or V2 and/or of the wheels 3. According to this embodiment, the optical scanning system 1 can be configured to communicate (for example, through wireless communication) data/signals indicative of the position of the vehicle 2 relative to a predetermined reference system SR to one or more vehicle analysis/diagnosis systems (which are not shown herein). Conveniently, a vehicle analysis/diagnosis systems can comprise a vehicle ADAS sensor control and/or calibration system (not shown), which is designed to control and/or calibrate advanced driver-assistance systems (ADAS) present in the vehicle 2. This control and/or calibration system is placed in the control station P, preferably in front of the vehicle 2, The vehicle ADAS sensor control and/or calibration system can receive the data/signals indicative of the position of the vehicle and determine its distance from the vehicle 2 based on its own position relative to the predetermined reference system SR of the optical scanning system 1 and on the received position of the vehicle 2.

According to a preferred embodiment shown in FIGS. 1-7, the optical scanning system 1 comprises optical image reader apparatuses 4. In the example shown in FIGS. 1 and 7, the optical scanning system 1 comprises two optical image reader apparatuses 4, which are arranged so as to be opposite one another on opposite sides of the vehicle 2, on the periphery thereof. In the example shown herein, the two optical image reader apparatuses 4 are arranged on a surface P. In the description below, without because of this loosing in generality, but for the purpose of increasing the clarity of the invention, an example will be taken into account, in which the support surface P of the two optical image reader apparatuses 4 is approximately coplanar to the support surface PV of the vehicle 2. However, according to the invention, the surface P could not be coplanar and/or parallel to the support surface PV of the vehicle 2.

The optical image reader apparatuses 4 are arranged so as to face two corresponding sides (lateral flanks) of the vehicle 2, which are parallel to and opposite relative to the axis A. In the example shown herein, the optical image reader apparatuses 4 are arranged so as to face the two sides of the vehicle 2 approximately in the area of the middle axis of the vehicle 2. However, the optical image reader apparatuses 4 can be arranged so as to face the wheels 3 of the vehicle 2.

The optical image reader apparatuses 4 are provided with respective optical image capturing devices 9 (described in detail below), which are configured to provide respective data/signals encoding one or more images entirely—or at least partially—representing the opposite sides of the vehicle 2 relative to the axis A.

The optical scanning system 1 further comprises a control and processing system 5, which is designed to process the data/signals provided by the optical image capturing devices 9 in order to determine/construct 3D (three-dimensional) images of the vehicle 2 and/or of parts thereof, by means of artificial vision algorithms, based on said data/signals. The aforesaid artificial vision algorithms are known and, as a consequence, will not be described any further.

Furthermore, the optical image reader apparatuses 4 each comprise a target 6 (or calibration target), which lies on the plane K (FIGS. 2 and 3) and is arranged immediately adjacent to the optical image capturing device 9 of the relative optical image reader apparatus 4. The target 6 is arranged on the reference plane K at a predetermined distance D1 from the relative optical image capturing device 9. The target 6 is arranged on the reference plane K so that it can be framed/visualized by the relative optical image capturing device 9.

In the example shown in FIGS. 1 to 7, the reference plane K is approximately horizontal. The target 6 can conveniently be arranged between the optical image capturing device and the side of the vehicle 2 facing the optical image capturing device 9. It is understood that according to the invention, the target 6 can be placed in any superficial position of the reference plane K that surrounds the image capturing device 9 and is immediately adjacent thereto so that it can be framed/visualized.

The electronic processing and control system 5 is designed to calibrate the optical image reader apparatuses 4 based on the images of the respective targets 6.

The Applicant found out that, by placing the target 6 directly close to the optical image capturing device 9 at a predetermined fixed distance D1 and by processing the image of the target 6 itself, a calibration of the optical image reader apparatus 4 comprising the target 6 and the optical image capturing device 9 can be carried out, even when the vehicle 2 is interposed/standing between the optical image reader apparatuses 4. As described below, by determining the relative position between the target 6 and the optical device 9 at predetermined instants, it is possible to identify and, hence, make up/compensate for possible movements of the reader apparatus 4 relative to its initial position (zero position) calculated relative to the same target 6.

With reference to FIGS. 1-7, each optical image reader apparatus 4 further comprises a plate-shaped element 7, which has a longitudinal axis C. The plate-shaped element 7 is arranged on the surface P and has, on its upper surface, the target 6. It is understood that the plate-shaped element 7 is arranged on a superficial portion of the surface on the periphery of the vehicle 2.

The optical image reader apparatus 4 further comprises a support column 8, which extends along a longitudinal axis B and is coupled to the plate-shaped element 7 in a position immediately adjacent to the target 6. The column 8 can be coupled to the plate-shaped element 7 so that its longitudinal axis B is approximately orthogonal to the plate-shaped element 7 and to its axis C. The column 8 supports at least one optical image capturing device 9. The optical image capturing device 9 is arranged in the column 8 so as to frame and capture the image of the target 6 present on the underlying plate-shaped element 7. According to a preferred embodiment shown in FIGS. 1-7, the upper surface of the plate-shaped element 7 is approximately flat and forms the plane K on which the target 6 is arranged. The plate-shaped element 7 further has a lower surface opposite the upper surface, which can be approximately flat. In the example shown in FIGS. 1-7, said lower surface rests on the surface P and is firmly fixed/anchored to the latter.

According to a preferred embodiment shown in FIGS. 1-7, the plate-shaped element 7 can comprise, for example, a flat plate or bracket made of a rigid material. Said rigid material can contain, for example, metal materials and/or polymer materials (plastic) or similar materials. In the example shown herein, the plate-shaped element 7 has an approximately rectangular shape and has, at a first axial end, the target 6. The target 6 is approximately planar, can comprise a two-dimensional (quadrangular) image representing a predetermined (calibration) pattern and is firmly fixed on the upper surface of the plate-shaped element 7 at its first axial end opposite the portion to which the support column 8 is coupled. In the example shown herein, the pattern comprises a geometry containing predetermined graphic elements (squares) in a (black and white) chessboard-like arrangement.

According to a preferred embodiment shown in FIGS. 1-7, the support column 8 can comprise a tubular section bar. Preferably, the tubular section bar 8 can have a polygonal section crosswise to the axis B. In the example shown herein, the support column 8 has a rectangular or square section and has four vertical rectangular faces parallel to the axis B. The upper end of the support column 8 preferably is closed and shaped like a grip.

The support column 8 can have the lower end closed by a coupling plate 11. The coupling plate 11 can conveniently be arranged orthogonal to the axis B. The coupling plate 11 can have a flat polygonal shape (namely, a square or rectangular or hexagonal shape) and has, on at least one side, one or more sliding wheels 12. The wheels 12 can preferably be cylindrical and be arranged on one side of the coupling plate 11. In use, the coupling plate 11 can be placed approximately on the second end of the plate-shaped element 7 opposite the first end accommodating the target 6 at a predetermined distance from the latter, so that the optical image capturing device 9 mounted in the column 8 is arranged at the predetermined distance D1 from the target 6. The technical effect of the wheels 12 is that of facilitating the manual displacement of the optical image reader apparatus 4.

Figure 2:
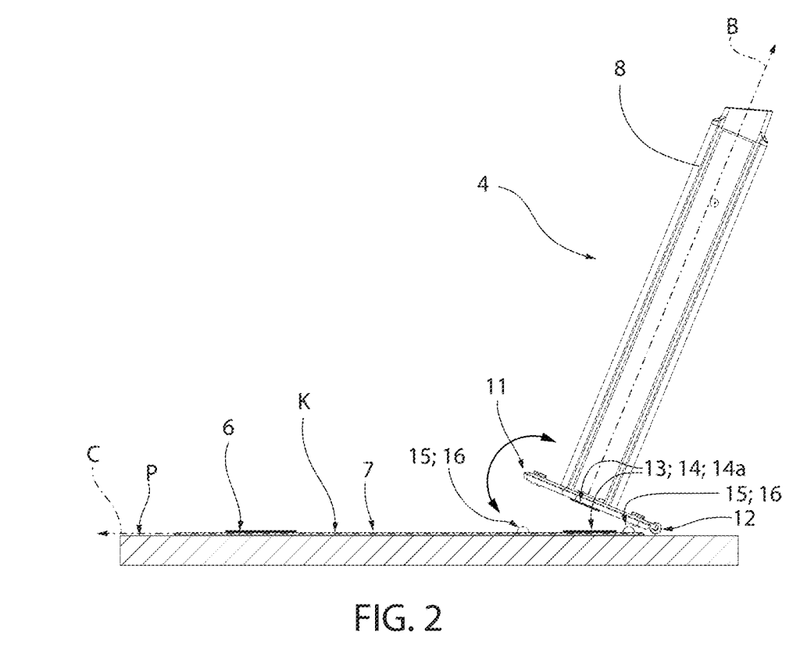
FIGS. 2 and 3 show an optical image reader apparatus present in the vehicle optical scanning system shown in FIG. 1 in two different operating conditions.
Figure 3:
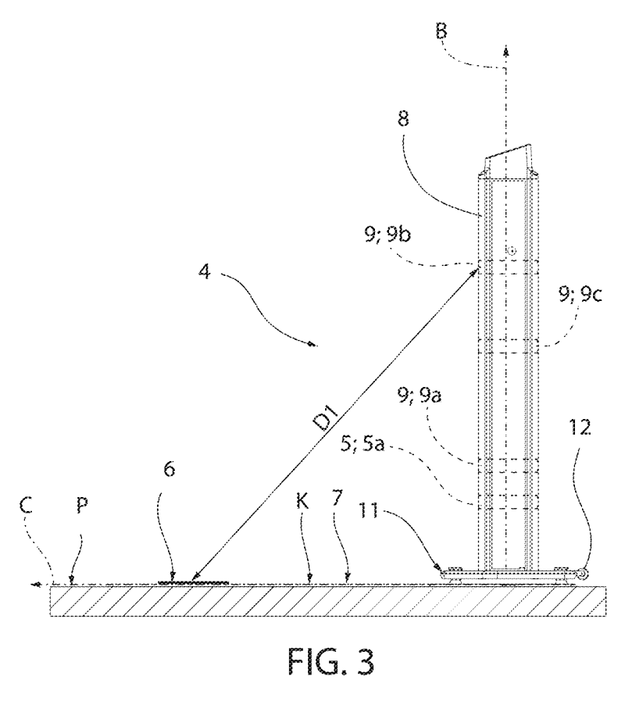

With reference to FIGS. 2-3, the optical image reader apparatus 4 can further conveniently comprise a connection device 13, which is structured to fix/anchor, in a stable yet easily separable/removable manner, the support column 8 to the plate-shaped element 7.

According to a convenient embodiment (FIGS. 2 and 3), the connection element 13 can comprise a magnetic coupling system 14 to magnetically couple/anchor the column 8 to the plate-shaped element 7. The magnetic coupling system 14 can comprise, for example, one or more magnetic elements 14a with opposite magnetic poles, at least one of them being arranged on the second end of the plate-shaped element 7. Another magnetic element 14a can be arranged, for example, on the support column 8, preferably in the coupling plate 11. The Applicant found out that the technical effect of the magnetic coupling system 14 is that of making the coupling of the support column 8 to the plate-shaped element 7 quick and simple. The connection device 13 can comprise, instead of or in addition to the magnetic coupling system 14, mechanical coupling members 17, for example threaded joining elements (screws and/or nuts) or any similar mechanism, to anchor/fix the coupling plate 11 on the plate-shaped element 7.

With reference to FIGS. 2 and 6, the optical image reader apparatus 4 can further comprise a self-centring mechanism 15 to centre the coupling of the support column 8 on the second end of the plate-shaped element 7. The self-centring mechanism 15 can comprise one or more projections or protuberances 16, which are arranged on the upper surface of the second end of the plate-shaped element 7 in predetermined points. The self-centring mechanism 15 can comprise a series of seats (not shown herein), which are obtained on the lower surface of the coupling plate 11 and have a position and a shape that are complementary to the position and the shape of the projections 16 in order to accommodate them when the coupling plate 11 rests on the second end of the plate-shaped element 7.

The projections 16 of the self-centring mechanism 15 can conveniently be sized and structured so that the coupling plate 11, when in it is arranged on the predetermined portion of the plate-shaped element 7, remains in a horizontal position, slightly lifted from the upper surface of the underlying plate-shaped element 7 at a height that is such as to also keep the wheels 12 lifted and not in contact with the surface P.

Figure 4:
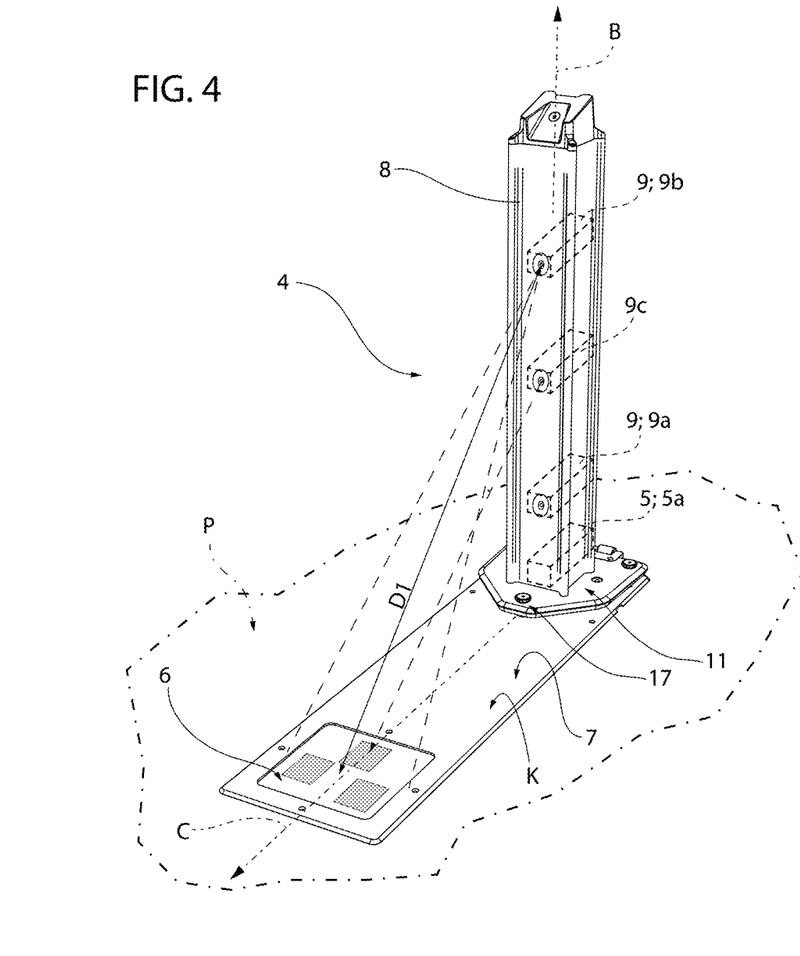
FIG. 4 is a perspective view, on a larger scale, of the optical image reader apparatus shown in FIGS. 1-3, wherein broken lines indicate the inner parts.
Figure 5:
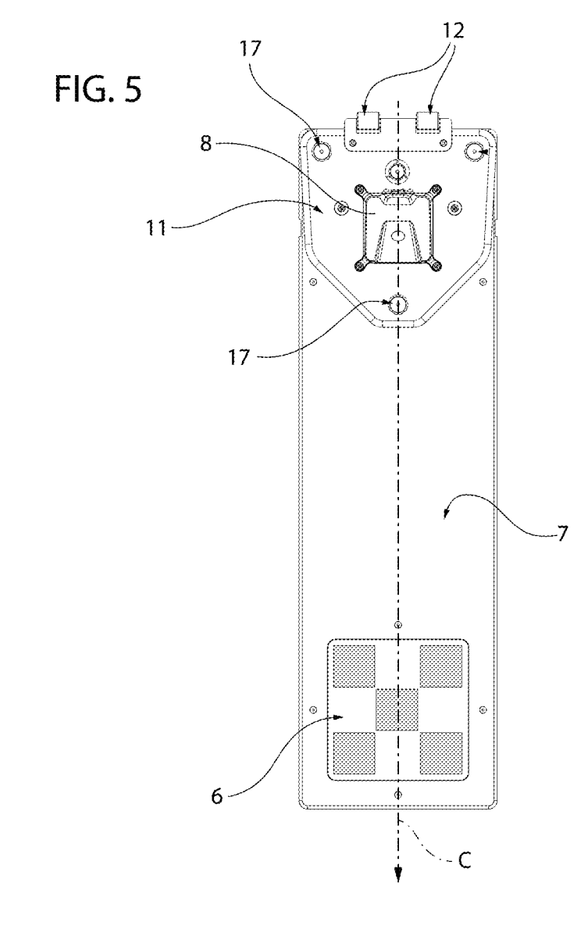
FIG. 5 is a plan view, on a larger scale, of the optical image reader apparatus shown in FIGS. 1-4.

With reference to FIGS. 3 and 4, the optical image capturing device 9 comprises at least one camera 9a. In the example shown herein, the optical image capturing device 9 further comprises a camera 9b, which is arranged at a predetermined distance from the camera 9a. The cameras 9a and 9b cooperate with the processing and control system 5 so as to implement a binocular stereoscopic vision method. The operation of the binocular stereoscopic vision method by means of two cameras in order to construct a 3D image is known and will not be described any further.

According to a preferred embodiment shown in FIG. 1-7, the camera 9a and the camera 9b are firmly arranged in the support column 8 so that the relative optical assemblies (lenses) face and are oriented on a common face/side of the support column 8 so as to frame a side of the vehicle 2. Preferably, the cameras 9a and 9b can frame the side of the vehicle 2 through through openings made in the face/side of the column 8. The cameras 9a and 9b are arranged in the column 8 so as to be axially spaced apart from one another along the longitudinal axis B at said predetermined distance. Preferably, the optical image capturing device 9 can further comprise at least one light source 9c, which is designed to emit a light beam to irradiate the target 6.

According to the preferred embodiment shown in FIGS. 3 and 4, the camera 9a is arranged in the support column 8 in a lower intermediate position, above the coupling plate 11. The camera 9b is arranged in the support column 8 in an upper intermediate position, immediately under the upper end of the column 8 itself. Preferably, the camera 9b is configured so as to frame both the side of the vehicle 2 and the target 6 present in the underlying plate-shaped element 7. Preferably, the camera 9a is configured to frame the side of the vehicle 2.

It is understood that the invention is not limited to an optical vision architecture that entails the use of cameras 9a and 9b to reconstruct three-dimensional images through the implementation of a binocular stereoscopic vision method, but, alternatively, other optical vision architectures can be used for the construction of a three-dimensional image. For example, according to an alternative embodiment (which is not shown herein), one or more cameras can be used, which are configured to carry out an optical image reading according to an optical vision architecture involving structured-light 3D scanning, which can entail the use of at least one projector (not shown) on the support column 8.

Furthermore, according to a different embodiment (which is not shown herein) alternative to the preferred embodiment described above, there can be an optical vision architecture with time-of-flight 3D image scanning and construction, which entail the use of a camera and of an IR (InfraRed) and/or (pulsed) laser emitter or projector or the like.

According to a preferred embodiment shown in FIG. 1, the processing and control system 5 can comprise one or more processing units 5a, which can conveniently be arranged inside the support columns 8. The processing units 5a can be configured to communicate with one another through a wireless communication system (which is not shown herein) in order to exchange the data/signals concerning the captured images. The processing system 5 can further comprise, alternatively or in addition to the processing units 5s, a central processing unit 500. The processing units 5a can comprise microprocessors or similar electronic processing circuits, whereas the central the processing unit 500 can comprise a desktop computer or a laptop or any other similar processing device. For example, the processing and control system 5 can construct, by means of the cameras 9a and 9b, the three-dimensional image of the wheel 3, in which each point (pixel) of the image is a function of the distance between the detail of the wheel taken into account and the camera 9b.

With reference of FIG. 6, the optical scanning method implemented by the system 1 entails, at first, a fixing operation to fix the plate-shaped elements 7 on the surface P in opposite positions. The plate-shaped elements 7 are fixed in predetermined points of the surface P on opposite sides of the vehicle 2. Preferably, the plate-shaped elements 7 are fixed on the surface P in a rigid (firm) manner, for example by means of known fixing members (screws or the like, which are not shown herein), and can have the relative axes C approximately aligned with (coaxial to) one another.

With reference to FIGS. 1 and 7, the method further comprises the step of coupling the columns 8 on the plate-shaped elements 7 so as to form the optical image reader apparatuses 4. When the column 8 is coupled to the relative plate-shaped element 7, the axis B is approximately vertical, its optical image capturing device is arranged at the predetermine distance D1 from the target 6 and frames the vehicle 2. It is understood that according to a different embodiment (which is not shown herein), the columns 8 can be firmly fixed on the plate-shaped elements 7 so as to form one single body. In this case, the fixing of the plate-shaped elements 7 on the surface also determines, at the same time, the positioning of the relative columns 8.

The method comprises a method for adjusting the optical image reader apparatuses 4, a method for measuring and/or controlling the vehicle 2 and/or parts/components of the vehicle 2 and a method for the calibration of the optical image reader apparatuses 4.

The adjustment method entails the step of determining the position of each optical image reader apparatus 4 relative to the other optical image reader apparatuses 4 in the predetermined reference system SR. In FIG. 1, in order to increase the understanding of the invention, the reference system SR is arranged in the area of the camera 9b of an optical image reader apparatus 4.

The determination of the space position of each optical image reader apparatus 4 (coordinates) relative to the reference system SR can be carried out, for example, by vertically placing an adjustment panel (which is not shown) on the surface P between the optical image reader apparatuses 4, approximately in the middle of the distance between the two opposite columns 8. The adjustment panel (which is not shown) can comprise, on the two opposite faces, two adjustment targets, each facing an apparatus 4. The optical image capturing devices 9 can capture the image of the two relative targets present on the adjustment panel.

The processing system 5 determines the distances of the optical image reader apparatuses 4 from the adjustment panel based on the processed images. By means of image processing and triangulation algorithms, which use, for example, suitable transformation matrices, the processing system 5 can determine the positions and the angles (of the optical axes) of each optical image reader apparatus 4 relative to the reference system SR. Obviously, in this step, the processing and control system 5 can store the intrinsic parameters of the two cameras 9a and 9b of each optical device 9, such as for example focal length, dimensions of a pixel, distortion parameters and their "exposure", namely position and angular orientation, relative to one another.

According to the invention, during the adjustment step, the optical image capturing device 9 of each optical image reader apparatus 4 further captures the image of the target 6 present on the underlying plate-shaped element 7.

The processing system 5 processes the image of the target 6 and determines, by means of an image processing algorithm, both the distance D1 of the optical image capturing device 9 relative to the target 6 and the angular orientation of the optical image capturing device 9 relative to the target 6. The angular orientation of the optical image capturing device 9 can be indicative, for example, of the angular orientation of the optical axis of the camera 9b relative to the target 6.

The processing system 5 determines, based on the distance D1 of the optical image capturing device 9 and on the angular orientation thereof, an initial position (zero position) and an initial angular orientation (zero orientation) of the apparatus 4 relative to the relative target 6 (self-zero condition) in the reference system SR. It should be pointed out that each target 6 is a fixed reference useful to determine, following the adjustment, the change in the position and/or the change in the angular orientation of the relative apparatus 4 with a high degree of precision.

The processing system 5 can store the geometric data obtained during the adjustment. The data can comprise: the space positions and the angular orientations of the optical image reader apparatuses 4 (relative to one another) in the three-dimensional reference system SR, the space positions and the angular orientations of each optical image reader apparatus 4 relative to the respective target 6 in the three-dimensional reference system SR.

Following the initial adjustment, the scanning system 1 is capable of implementing the method for measuring and/or controlling the vehicle 2 and/or the parts/components of the vehicle 2. According to said method, the processing system 5 processes the data/signals provided by the image reader apparatuses 4 in order to determine the three-dimensional images of the sides of the vehicle 2.

According to a preferred embodiment of the method, the processing system 5 processes the data/signals received from the image reader apparatuses 4 through image processing algorithms in order to determine the geometric parameters characterising the wheels 3 of the vehicle 2. According to the method, for example, the processing and control system 5 determines the position and the angle of the wheels 3 relative to the predetermined reference system SR. According to the method, for example, the processing and control system 5 determines the position and the angle of the axles V1, V2 of the vehicle 2 relative to the predetermined reference system SR. According to the method, furthermore, the processing and control system 5 determines the position of the vehicle 2 based on the position of the wheels 3 and/or of the axles V1, V2 relative to the predetermined reference system SR.

In case the space taken up by the apparatuses 4 in the control station needs to be freed, the columns 8 can conveniently be uncoupled from the plate-shaped elements 7 (FIG. 6). In this condition, the plate-shaped elements 7 remain in the relative predetermined fixed position, but their planar/flat and thin shape has irrelevant dimensions.

When the method for measuring and/or controlling a vehicle 2 and/or the parts/components of the vehicle 2 needs to be implemented again, the columns 8 are fitted again onto the relative plate-shaped elements 7 so as to form the optical image reader apparatuses 4 of the system 1.

Conveniently, the method entails the implementation of the method for calibrating the optical image reader apparatuses 4 relative to the relative targets 6. It should be pointed out that the method does not require again the implementation of the adjustment method described above, since the position of the plate-shaped elements 7 relative to the reference system SR remains unchanged.

According to the calibration method, the two optical image reader apparatuses 4 capture the image of the two targets 6 present on the corresponding plate-shaped elements 7.

According to the calibration method, for each reader apparatus 4, the processing system 5 processes the image of the relative target 6 captured by the camera 9b and determines the actual distance D1 of the corresponding optical image capturing device 9 relative to the corresponding target 6 and the actual angular orientation of the optical image capturing device 9 relative to the target 6.

For example, according to a possible processing, the image provided by the camera 9b can be analysed/processed so as to determine the two-dimensional 2D position (in pixels) of some specific points of the target 6. Furthermore, the position of these points relative to three-dimensional reference system SR is assumed to be known. Therefore, for each point of the target 6 taken into account, its position both in the two-dimensional image plane and relative to the reference system SR is known. The 2D-3D (two-dimensional-three-dimensional) correspondences provide an overdetermined equation system, which is solved by the processing and control system 5 in order to estimate the exposure (position and angular orientation) of the camera 9b relative to the relative target 6.

According to the calibration method, the processing and control system 5 determines, for each optical reader apparatus 4, the distance variation, namely the difference between the distance D1 measured during the calibration method and the distance D1 measured and stored during the adjustment method (zero position). According to the calibration method, the processing and control system 5 determines, for each optical reader apparatus 4, the angular variation, namely the difference between the angular orientation of the optical image capturing device 9 determined during the calibration method and the angular orientation of the optical image capturing device 9 determined during the adjustment method (zero orientation).

According to the calibration method, the processing system 5 stores, for each optical reader apparatus 4, the determined distance variation and the determined angular orientation variation. The calibration method entails automatically calibrating each optical reader apparatus 4 (distance and angular orientation) based on the detected distance and angular orientation variations.

During the following implementation of the method for measuring and/or controlling the vehicle 2 and/or the parts/components of the vehicle 2, the processing system 1 can, for example, introduce offsets in the images and/or in the measures and/or in the geometric parameters based on the distance and angular orientation differences determined for the optical image reader.

For example, the offsets can be stored in correction/compensation matrices containing numerical values indicative of the offsets to be applied to the distances and/or to the angles to be taken into account during the construction of the three-dimensional image of the vehicle 2.

The system described above is advantageous in that it is capable of carrying out the calibration with a high precision and frequency, even when a vehicle is standing in the control station.

Furthermore, thanks to the configuration of the plate-shaped elements, the columns can be removed form the control station so as to clear the space taken up by them. With every following installation of the support columns on the plate-shaped elements, the system is capable of ensuring a high precision thanks to the implementation of the calibration method, with no need to carry out a new adjustment using the panel with the adjustment target. It should be pointed out that, on the one hand, the position of the column and, hence, of the image reader apparatus relative to the reference system SR remains stable and, on the other hand, possible changes in the position and/or orientation of the apparatus relative to the adjustment condition are detected and made up for with utmost precision thanks to the processing of the image of the reference target of the apparatus.

Finally, it is clear that the system and the method described above can be subject to changes and variations, without for this reason going beyond the scope of protection of the present invention defined in the appended claims.

Figure 8:
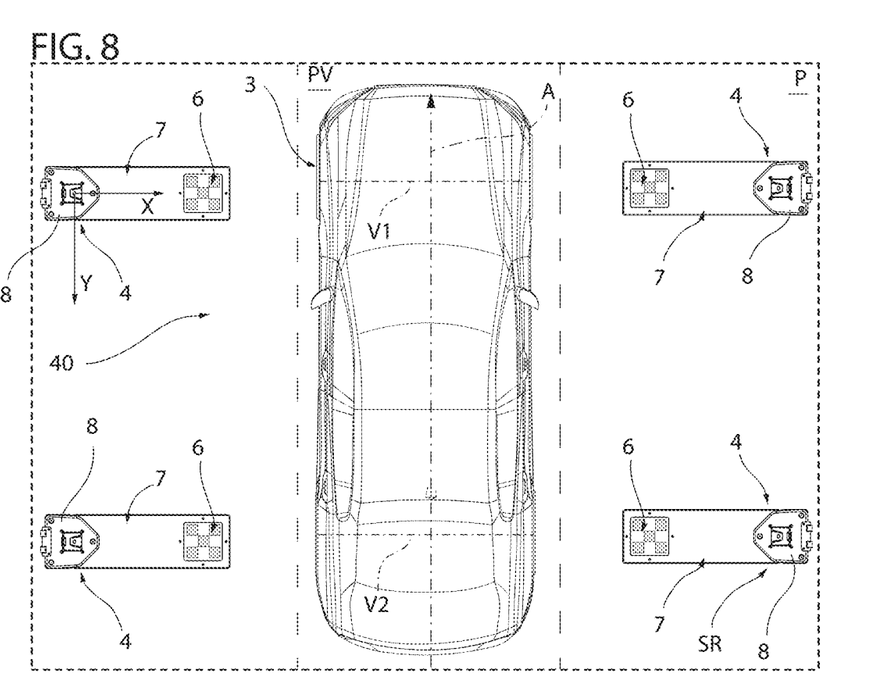
FIG. 8 is a view from the top of the vehicle optical scanning system according to a variant.

The embodiment schematically shown in FIG. 8 relates to an optical scanning system 40, which is similar to the optical scanning system 1 described above and whose components will be identified, when possible, with the same reference numbers as the ones indicating the optical scanning system 1 described above with reference to FIGS. 1-7.

The optical scanning system 40 differs from the optical scanning system 1 in that it is provided with four image reader apparatuses 4 instead of two image reader apparatuses 4.

With reference to FIG. 8, two image reader apparatuses 4 are arranged on opposite sides of the axis A of the vehicle 2 in positions approximately facing the respective wheels 3 of the front axle V1 of the vehicle. The other two image reader apparatuses 4 are arranged on opposite sides of the axis A in positions approximately facing the respective wheels 3 of the rear axle V2 of the vehicle 2.

The operation of and the method implemented by the optical scanning system 40, namely, in particular, the method for adjusting and calibrating each apparatus 4 of the optical scanning system 40, correspond to the method for adjusting and calibrating each apparatus 4 of the optical scanning system 1.

Figures 9, 10:
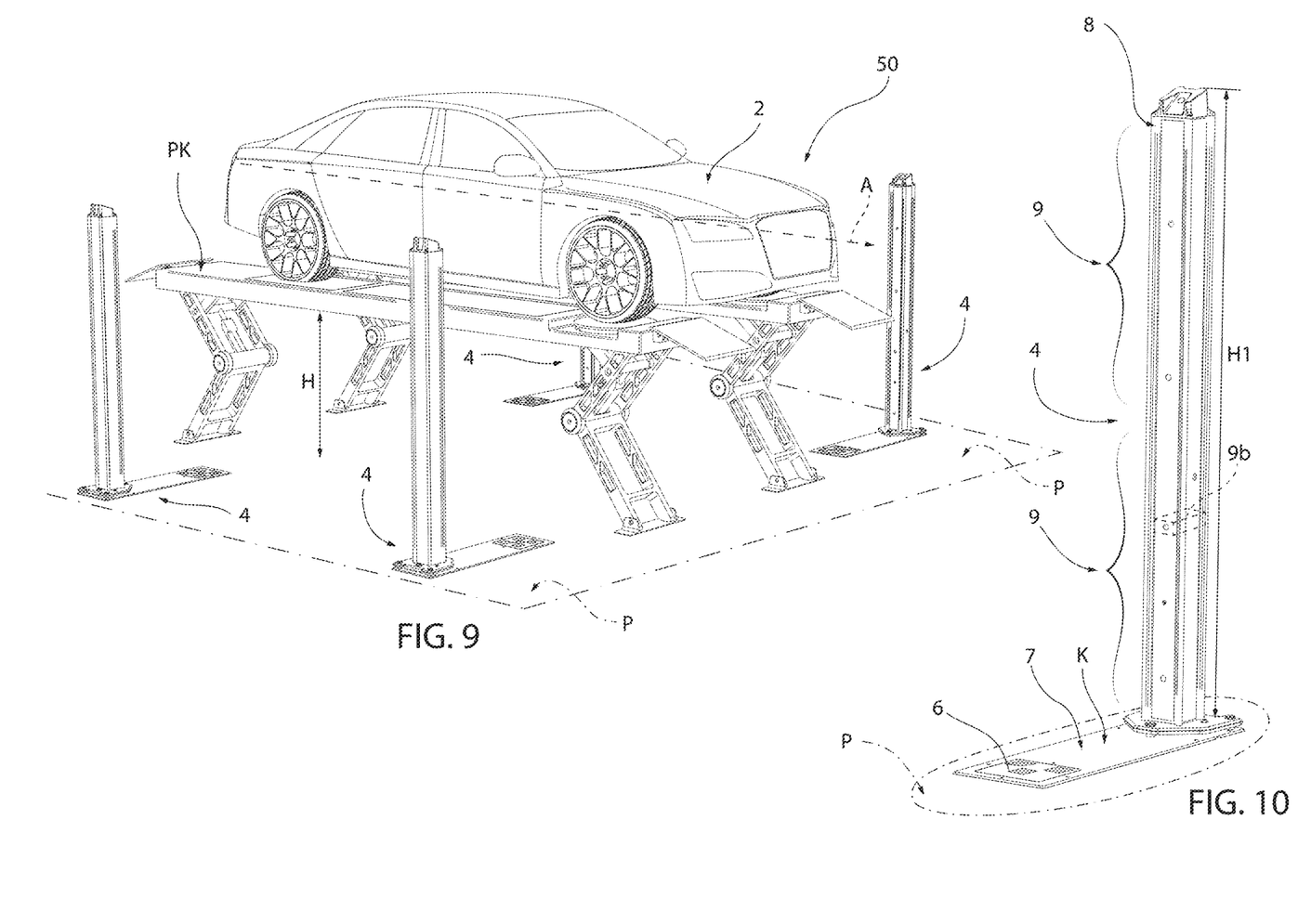
FIG. 9 is a perspective view of the vehicle attitude control system according to a further variant.
FIG. 10 is a perspective view of the optical image reader apparatus shown in FIG. 9.

The embodiment shown in FIGS. 9 and 10 relates to an optical scanning system 50, which is similar to the optical scanning system 1 described above and whose components will be identified, when possible, with the same reference numbers as the ones indicating the optical scanning system 1 described above with reference to FIGS. 1-7.

The optical scanning system 50 differs from the optical scanning system 1 in that it comprises four optical image reader apparatuses 4 arranged on the surface P similarly to the optical image readers apparatuses 4 of the optical scanning system 40 and in that each optical image reader apparatus 4 comprises two optical image capturing devices 9 axially spaced apart along the axis B, instead of one single optical image capturing device 9 (FIG. 10). In each optical image reader apparatus 4, a first optical image capturing device 9 is arranged in the lower portion of the column 8 and a second optical image capturing device 9 is arranged in the upper portion of the column 8 above the other optical image capturing device 9.

The optical scanning system 50 further differs from the optical scanning system 1 in that the control station comprises a movable surface PK, which supports the vehicle 2. The surface PK is designed to be moved, on command, between a rest position (first position, not shown herein), in which it is approximately coplanar to the surface P, and a work position (second position) (shown in FIG. 9), in which the surface PK is lifted relative to the rest position (and to the surface P) at a predetermined height H. The movable surface PK can correspond, for example, to a movable platform of a lift 52 for vehicles 2. The lift 52 shown herein is known and, therefore, will not be described any further.

The first optical image capturing device 9 can be arranged in the support column 8 of the apparatus 4 so that its upper camera 9b frames the target 6 and the side of the vehicle 2 when the surface PK is in the rest position.

The second optical image capturing device 9 is arranged in the support column 8 so that its upper camera 9b and its lower camera 9a frame the side of the vehicle 2 when the surface PK is in the operating work position. Hence, the electronic processing and control system 5 selectively operates the first and the second optical image capturing device 9 based on the position of the work surface PK relative to the surface P. Preferably, the height H1 of the columns 8 is greater than the height H of the work surface PK in the work position.

The invention claimed is:

1. An optical scanning system for measuring and/or controlling a vehicle and/or parts of a vehicle, wherein the vehicle is arranged on a control station, the optical scanning system comprises:
    at least two optical reader apparatuses which are arranged on a plane (P) of said control station, on opposite sides of the longitudinal axis (A) of said vehicle, in order to be facing to the opposite lateral sides of the vehicle,
    the two optical reader apparatuses are provided with respective optical image capturing devices configured to provide respective data/signals encoding one or more images at least partially containing said opposite sides of the vehicle,
    an electronic processing and control system which is configured to process said data/signals in order to determine and construct one or more three-dimensional images relative to said vehicle and/or to parts of the vehicle,
    said optical reader apparatuses each comprise:
    a calibration target which is a fixed reference positioned adjacent to the optical image capturing device of the relative optical reader apparatus at a pre-established distance from the same,
    said optical image capturing device is configured to capture one or more images of said adjacent fixed target in order to provide respective data/signals encoding the image of the target itself,
    said electronic processing and control system is configured to calibrate said optical reader apparatuses based on the images of the respective fixed targets,
said optical scanning system is characterized in that
    said optical image capturing reader apparatus comprises:
    a plate-shaped element which extends along a longitudinal axis (C) transversal to said longitudinal axis (A) and is fixed on said plane (P) in a position approximately adjacent to a side of the vehicle, said plate-shaped element has an upper surface on which said fixed target is placed, a column which is coupled to the plate-shaped element so that its longitudinal axis (B) is approximately orthogonal to the longitudinal axis (C) of said plate-shaped element and so that the relative optical image capturing device is arranged at said pre-established distance from said fixed target, said optical image capturing device is firmly coupled in said column and is configured so as to capture/acquire the image of the fixed target present on the underlying plate-shaped element.

2. The optical scanning system according to claim 1, comprising a connection device structured to fix/anchor, in a separable/removable manner, said column to said plate-shaped element.

3. The optical scanning system according to claim 2, wherein said connection device comprises a magnetic coupling system for magnetically fixing/anchoring said column to said plate-shaped element.

4. The optical scanning system according to claim 1, comprising centering means for positioning said column on a pre-established superficial portion of said plate-shaped element.

5. The optical scanning system according to claim 1, wherein said column comprises one or more wheels.

6. The optical scanning system according to claim 1, wherein said optical image capturing device comprises at least a first camera.

7. The optical scanning system according to claim 6, wherein said optical image capturing device comprises at least a second camera which cooperates with said first camera in order to define with the same a binocular stereo vision system.

8. The optical scanning system according to claim 7, wherein said first and second cameras are arranged in the relative column along a relative longitudinal axis (B) mutually spaced from one another.

9. The optical scanning system according to claim 1, wherein said optical image capturing device of said optical reader apparatus comprises at least a light source configured to emit a light beam to selectively irradiate said target present on the upper surface of said plate-shaped element of the optical reader apparatus itself.

10. The system according to claim 1, wherein the optical image capturing device comprises optical reading means for time of flight.

11. The system according to claim 8, wherein said control station comprises a movable support surface of said vehicle which is configured to be moved between a first and a second operating position having respective heights with respect to the surface (P) one being greater than the other; said optical reader apparatuses each comprise two optical image capturing devices which are arranged in the relative column axially spaced one from the other, at respective heights which depend upon the heights of the support surface in the first and second operating positions, said electronic processing and control system is configured to selectively actuate the optical image capturing devices in the column based on the positioning of said support surface in the first and second operating positions.

12. The optical scanning system according to claim 11, wherein said electronic processing and control system is configured to calibrate said optical reader apparatus based on the image of the respective target captured by a camera of the optical image reader device associated with the operating position having the lowest height.

13. The optical scanning system according to claim 1, wherein said electronic processing and control system is configured to process said data/signals in order to construct one or more three-dimensional images relative to parts of the vehicle corresponding to the wheels of the vehicle, and process said images in order to determine geometric parameters that characterize said wheels with respect to a pre-established reference system (SR).

14. The optical scanning system according to claim 13, wherein said electronic processing and control system is configured to process said data/signals in order to construct one or more three-dimensional images relative to parts of the vehicle corresponding to at least an axle of the vehicle, and process said images in order to determine the position and/or the orientation of said vehicle in said control station with respect to the pre-established reference system (SR).

15. The optical scanning system according to claim 14, wherein said electronic processing and control system is configured to communicate to at least an advanced driver assistance system (ADAS) calibration system, signals/data indicative of the position and/or orientation of said vehicle in said control station with respect to the pre-established reference system (SR).

16. The optical scanning system according to claim 1, comprising four image reader apparatuses, which are arranged in positions facing respective wheels of said vehicle.

17. Optical scanning system for measuring and/or controlling a vehicle and/or parts of a vehicle, where the vehicle is arranged on a control station, the optical scanning system comprises:

at least two optical reader apparatus which are arranged on a plane (P) of said control station, on opposite sides of the longitudinal axis (A) of said vehicle, in order to be facing to the opposite lateral sides of the vehicle, the two optical reader apparatus are provided with respective optical image capturing devices configured to provide respective data/signals encoding one or more images containing at least partially said opposite sides of the vehicle, an electronic processing and control system which is configured to process said data/signals in order to determine and construct one or more three-dimensional images relating to said vehicle and/or to parts of the vehicle, said optical reader apparatuses each comprise:

a plate-shaped element which extends along a longitudinal axis (C) transversal to said longitudinal axis (A) and is fixed on said plane (P) in a position adjacent to one side of the vehicle, said plate-shaped element has a horizontal upper surface on which a fixed horizontal calibration target is arranged adjacent to the optical image capturing device of the relative optical reader apparatus at a predetermined distance from it, said optical image capturing devices is configured to capture one or more images of said fixed horizontal calibration target on said plate-shaped element so as to provide respective data/signals encoding the image of the fixed horizontal calibration target itself, said electronic processing and control system is configured to calibrate said optical reader apparatuses on the basis of the images of the respective fixed horizontal calibration targets.

18. Optical scanning system according to claim 17, wherein said optical reader apparatus comprises a column which is coupled to the plate-shaped element in order that its longitudinal axis (B) is approximately orthogonal to the said plate-like element and that the relative optical image acquisition device is arranged at said predetermined distance from said target, said optical image acquisition device is stably coupled in said column and is configured to acquire/capture the image of the target present on the plate-shaped element below.

19. An optical scanning method configured to measure and/or control a vehicle and/or parts of a vehicle, wherein the vehicle is arranged in a control station, the method comprises the steps of:

positioning at least two optical reader apparatuses on a surface (P) of said control station, on opposite sides of the longitudinal axis (A) of said vehicle, in order to be facing opposite sides of the vehicle, wherein the two optical reader apparatuses are provided with respective optical image capturing devices configured to provide respective data/signals encoding one or more images at least partially containing said opposite sides of the vehicle, processing said data/signals in order to determine and construct one or more three-dimensional images relative to said vehicle and/or to parts of the vehicle, arranging a calibration target on said surface (P) in a position horizontal immediately adjacent to the optical image capturing device of the relative optical reader apparatus at a pre-established distance from the same in order to be a fixed reference, acquiring, via optical image capturing device, one or more images of said adjacent horizontal calibration target thus providing respective data/signals encoding the image of said horizontal calibration target itself, calibrating said optical reader apparatuses based on the images of the respective horizontal calibration target, said method being characterized in that:

said optical image capturing reader apparatus comprises:

a plate-shaped element which lies on a horizontal plane and extends along a longitudinal axis (C) transversal to said longitudinal axis (A), the plate-shaped element has an upper surface, on which said horizontal calibration target is arranged in order to lie on a horizontal plane, and a column, in which said optical image capturing device is arranged, the method comprises the steps of:

firmly fixing said plate-shaped element on said surface (P) in a position approximately adjacent to a side of the vehicle, coupling said column to the plate-shaped element so that its longitudinal axis (B) is approximately orthogonal to the longitudinal axis (C) of said plate-shaped element and so that the relative optical image capturing device is arranged at said pre-established distance from the fixed horizontal calibration target, acquiring/capturing the image of the horizontal calibration target present on the underlying plate-shaped element by means of said optical image capturing device present in said column.

20. The method according to claim 19, comprising the step of fixing/anchoring, in a separable/removable manner, said column to said plate-shaped element by means of a connection device.

* * * * *